United States Patent [19]

Herdman et al.

[11] 3,864,748

[45] Feb. 4, 1975

[54] MAGNETIC DISK MEMORY

[75] Inventors: Craig T. Herdman; Peter E. Jacobson, both of Phoenix, Ariz.

[73] Assignee: Sperry Rand Corporation, Great Neck, N.Y.

[22] Filed: July 23, 1973

[21] Appl. No.: 381,817

[52] U.S. Cl. .................................. 360/102, 360/133

[51] Int. Cl. .................................................. G11b 5/60

[58] Field of Search .............. 360/102, 103, 97, 133

[56] References Cited

UNITED STATES PATENTS

| | | | |
|---|---|---|---|
| 3,196,422 | 7/1965 | Chency | 360/133 |
| 3,368,210 | 2/1968 | Zimmer | 360/103 |
| 3,643,240 | 2/1972 | Raiser | 360/133 |

*Primary Examiner*—Vincent P. Canney

*Attorney, Agent, or Firm*—Howard P. Terry

[57] ABSTRACT

A magnetic disk memory for digital computers particularly suitable for airborne applications, including a rotating disk and a large plurality of gas bearing supported read/write heads arranged over the surface of the disk in staggered, overlapping triads (at the apexes of a substantially equilateral triangular support member), each magnetic core element of each triad having its leading edge tapered to form a separate ramp inlet gas bearing and each triad assembly having a first flexure member for supporting the triad with freedom about its pinch and roll axis (relative to disk velocity) for accommodating any disk undulations and rigidity about its yaw axis, and a second flexure member for applying a preload for the supporting gas pressure. Simultaneous retraction of all triads is accomplished by a lift finger associated with each support spring and all simultaneously actuated by a common, electromagnetically operated member; each triad further including means for imparting an initial rotational bias about its pitch axis so that upon release of the retraction means, in response to a disk speed monitor, each triad approaches its "landing" with an initial angle of attack to thereby eliminate any divergent friction-produced pitching moments during initial alignment.

10 Claims, 6 Drawing Figures

MAGNETIC DISK MEMORY

BACKGROUND OF THE INVENTION

1. Field of the Invention

The present invention relates generally to magnetic disk memory apparatus for digital computers and more particularly to short access time memories of long life, small size and low cost and particularly applicable to airborne environments, for example in digital automatic flight control systems, area navigation systems and other aircraft digital computer controlled systems.

2. Description of the Prior Art

Magnetic memory disks have been used for many years for storing and retrieving digital computer bit information. Generally, these disks have been large, complex and expensive and hence unsuitable for aerospace application. However, with the ever increasing demand for digital computers in such aerospace applications and the need for the desirable functional characteristics of disk memories, the size, weight, complexity and cost disadvantages of ground based memories have to be overcome. All of these disadvantages have been overcome by the magnetic disk memory of the present invention.

In disk memories, the design of the magnetic read/write head, its support structure, and the means whereby the heads may be brought into operating relation to the disk surface and retracted from such surface when not operating is of major significance. For example, in one prior art design type, a plurality of heads on a common support member is "floated" on a thin film of air a few millionths of an inch thick and means have been suggested for supporting the heads on spring supports having compliances such that the head may adapt itself to any unevenness or undulations on the surface of the recording disk and yet provide rigidity relative to direction of disk velocity. Such a head and head support design is shown in U.S. Pat. No. 3,701,610 and the present invention constitutes a significant improvement over this prior design. These improvements include an improved air-bearing configuration, an improved compliant support for the head and its support member, together with a unique head extension and retraction mechanism. Other design features relate to the disk mounting and drive structure. All of these design innovations contribute to a novel disk memory assembly having a configuration characterized by its small volume and comparitive high bit capacity, short access time, long life, and low cost and particularly its higher than normal resistance to severe environmental conditions such as vibration and possible contamination during assembly and servicing. Thus, the disk memory of the present invention is ideally suited to airborne digital computer applications.

SUMMARY OF THE INVENTION

The magnetic disk configuration of the present invention includes a unique design of the read/write heads wherein the head and head support are levitated by a gas bearing. Instead of embedding the ferrite cores of the heads within a support means made for example from plastic or ceramic and then grinding a large surface air bearing configuration on this assemblage as in conventional practice, the ferrite cores are embedded in the support means, which may be for an example an anodized aluminum plate, such that the gap portion of the core only extends from the support, and air bearing ramps or gas squeeze configurations are lapped on the leading edge (relative to disk velocity) of the core elements themselves. The advantages of this structure lie in the provision of a much smaller gas bearing surface or "footprint" adjacent the disk surface resulting in greatly improved reliability and manufacturing and the test costs since any dust particles in the supporting gas, which may accumulate in use or during assembly and test tend to flow around the small head and not be trapped between the head and disk surface. Another advantage results from the fact that the air bearing surface of the head constitutes but a single material and the bearing surface is thus dimensionally stable over extreme temperature ranges. In one embodiment a plurality of heads are supported in the above manner on a single aluminum support means, each core portion extending therefrom having the inlet ramp.

Another unique concept in the disk memory of the present invention is embodied in the mounting flexure of the read/write head and its retraction and extension mechanism. As mentioned above, a plurality of ferrite read/write core elements may be supported on a single support member with the core elements extending below this member and having air or gas bearing configurations thereon. In one embodiment, three heads are so embedded in an aluminum plate in the shape of a thin flat equilateral triangle with the core elements located in the corners thereof with one corner leading and two trailing relative to disk velocity (similar to a delta winged aircraft). This head configuration will be descriptively referred to hereinafter as the "trimaran" head. The trimaran head is supported by a first flexure so arranged to provide limited rotational or pivotal freedom about its "pitch" and "roll" axes but rigid about its "yaw" axis, again relative to the tangential direction of the disk velocity vector whereby the trimaran head will self adapt to disk irregularities or undulations. A second flexure is arranged to provide in operation a preload on the trimaran head for opposing the gas bearing forces. Since the gas bearing support for the trimaran head constitutes a three point suspension, the second flexure is designed to apply its load through a point on the head member which corresponds both to the centroid and center of buoyancy thereof. However, in accordance with this invention, this preload point is located slightly behind (relative to disk velocity) the pitch support axis so that with the head member retractd away from the disk surface, the preload flexure will impart a positive or upward pitching moment about the pitch axis to provide a predetermined initial angle of attack of the trimaran head. Thus, as the head is lowered into operative relation to the disk surface, this initial attitude angle will insure that the trailing head elements will contact the disk surface first which will eliminate any divergent friction produced pitching moments during the alignment phase of the trimaran head with the disk surface. This self stabilizing characteristic is further enhanced by supporting the trimaran head on an elongated flexure and securing the flexure to the housing "upstream" of the head relative to disk velocity, i.e., the head "trails" its support point.

In the magnetic disk memory of the present invention, a plurality of trimaran head assemblies are distributed circumferentially around the outer portion of the magnetic disk at ever decreasing radii, the radial separation being such that the read/write trimaran heads radially overlap each other to define a plurality of closely spaced radial recording tracks. For example, in one embodiment having about a four inch diameter disk, eight identical trimaran head assemblies were distributed on a relatively narrow circumferential spiral path about the disk center, the pitch of the spiral and trimaran head core spacing being such that two tracks could be accommodated between the radial separation between the leading and one trailing core of each trimaran head cluster whereby in all, 24 record/read tracks were accommodated by the eight head assemblies and only about five eighths inch of the outer circumferential portion of the disk was used. This memory had a capacity of nearly one million digital information bits.

The head retraction and extension technique of the magnetic disk memory of the present invention involves a common mechanical means operated by a common electromagnetic actuator for simultaneously operating a retraction and extension means associated with each trimaran head assembly. Each head assembly includes a leg or rod slidably supported in the head/-flexure support assembly which has a foot portion thereof extending underneath the trimaran support flexure and a spring means biasing the foot in a direction to retract the head. As stated, the heads are supported to move perpendicularly to the disk surface and are substantially circumferentially spaced about the disk spin axis and the retraction legs all extend parallel to and radially spaced from the disk spin axis. Thus a common disk shaped member, coaxial with the recording disk, is supported on guide pins to move axially relative to the head supports and in contact with the retraction legs. A solenoid core and coil fixedly supported relative to the memory housing and coaxial with the recording disk is arranged, when energized, to axially and simultaneously move all the retraction legs in a direction toward the memory disk thereby compressing the leg bias springs and lowering the foot to thereby allow the trimaran preload flexure to urge the head to its operating position. This arrangement is fail safe since loss of system energization will result in head retraction. The retraction of plunger plate may be further urged to the retract position by further return spring means.

A further feature of the disk memory of the present invention relates to its ease of maintenance, particularly the ease of removing and cleaning or otherwise servicing the disk and its motor and arbor assembly. In any high speed spinning device the preloading of the support bearings is critical and in the past each time it was necessary to remove the driven member, in this case the disk, and its drive motor for cleaning or repair, the disk had to be rebalanced dynamically and the bearings carefully repreloaded, a time consuming operation. In the present invention, the memory disk-motor arbor is removable as a complete assembly and after servicing reassembled without the necessity of rebalancing and repreloading the spin bearings. Further, the entire assembly of all the read/write heads is removable as a unit from the memory for repair and/or cleaning and reassembled without disturbing the trimaran head preloads.

DESCRIPTION OF THE PREFERRED EMBODIMENT

Figure 1:
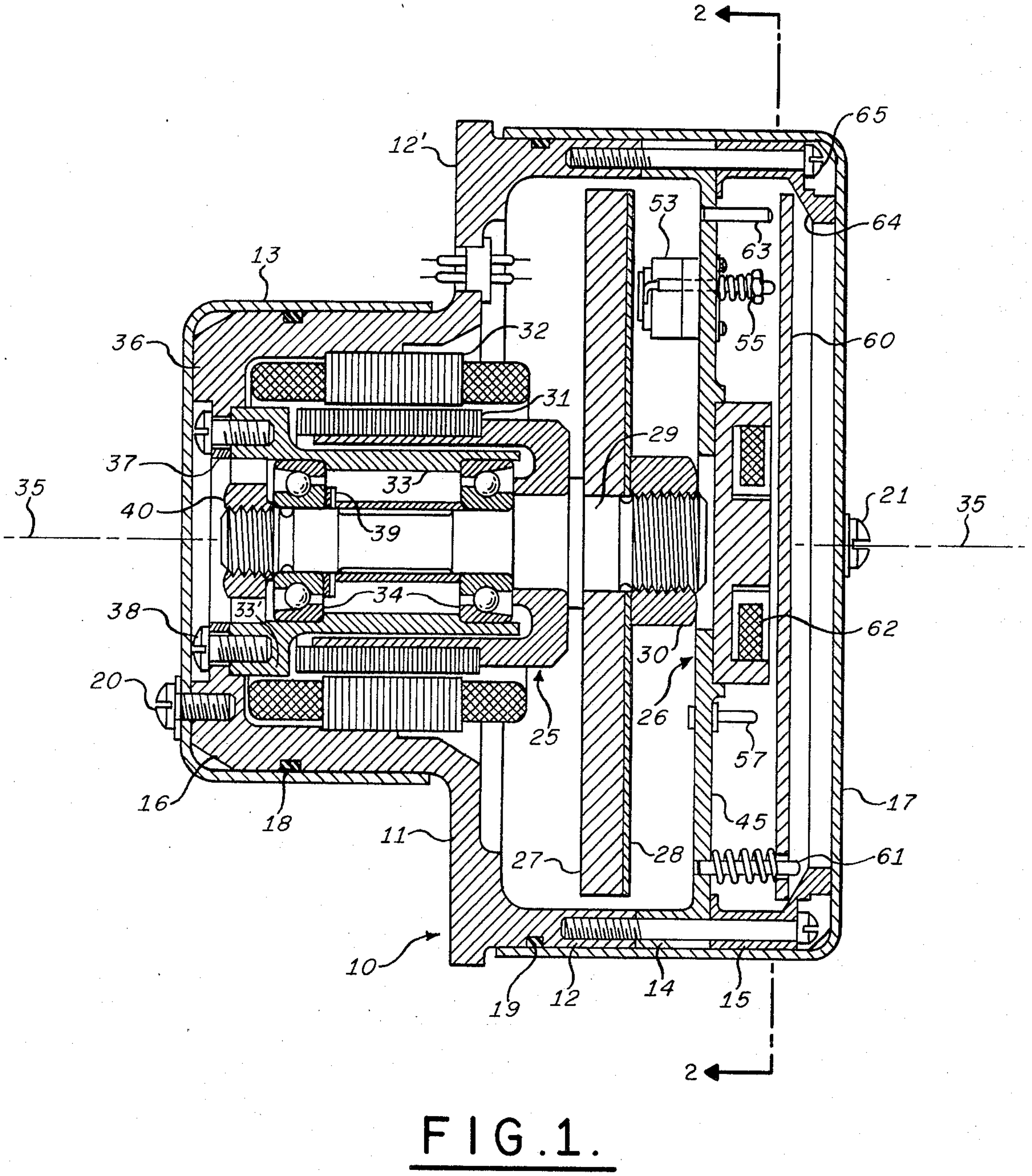
FIG. 1 is a longitudinal cross sectional view of the magnetic disk memory taken along line 1—1 of FIG. 2 and incorporating the concepts of the present invention.
Figure 2:
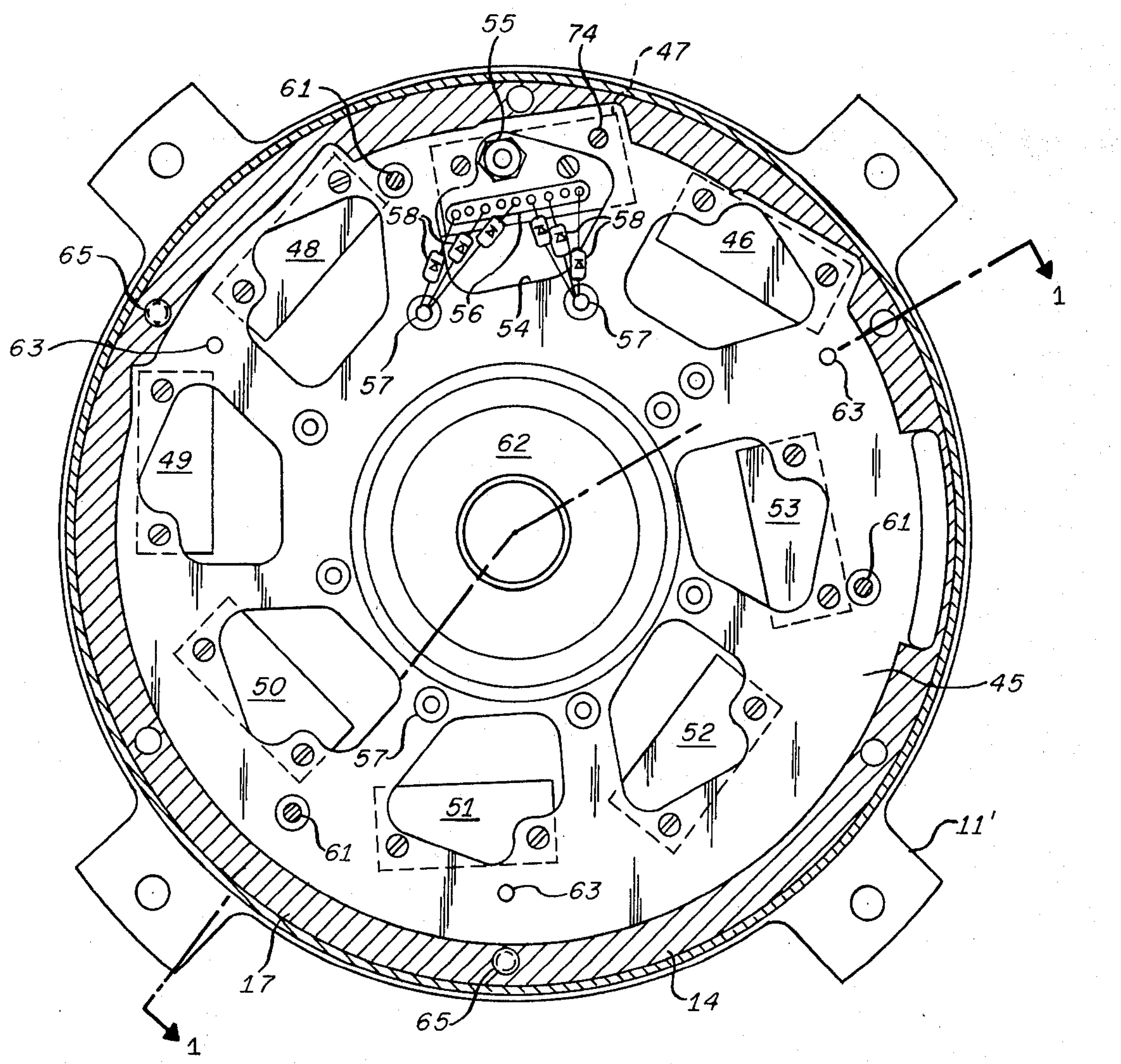
FIG. 2 is a lateral cross sectional view of the disk memory taken on line 2—2 of FIG. 1.

Referring first to FIGS. 1 and 2, the magnetic disk memory apparatus comprises, generally, a cylindrical housing 10 including a base casting 11 having suitable mounting flanges 11', cylindrical outer wall portion 12, intermediate end wall portion 12' and a further cylindrical wall portion 13 of lesser diameter than wall 12, an intermediate cylindrical outer wall portion 14 and an end cylindrical wall portion 15. The wall portions 13 and 15 are adapted to receive protective covers 16 and 17 respectively, sealed as by suitable O-rings 18 and 19 and retained in place by screws 20 and 21. All operating components of the disk memory are contained within the cylindrical housing 10 and comprise two main subassemblies; the magnetic disk and arbor assembly 25 and the main read/write head and extension and retraction assembly 26. Each of these subassemblies are readily removable for maintenance purposes, the disk and arbor assembly 25 being removed, serviced and replaced without changing the dynamic balance of the disk or preload of its spin bearings; and the main head assembly 26 being removed, serviced and replaced without disturbing the read/write head preloads. Furthermore, this service need not be performed in so-called "clean room" familiar to those skilled in the instrument art, since the head configuration is not susceptible to fouling by normal dust particles, as will be described below.

The disk/arbor subassembly comprises a relatively thick, metallic disk 27 having a surface 28 plated with a suitable magnetizable material such as a conventional nickel/cobalt alloy. The disk 27 is rigidly secured on the flanged and threaded end of an arbor or shaft 29 as by nut 30. Shaft 29 also rigidly supports a cup-shaped armature 31 which, together with stator 32 comprise the electrical drive motor for the disk 27. Stator 32 is supported in the cylindrical wall portion 13 of housing 10. Extending into cupshaped rotor 31 is a hollow stub shaft 33 which accommodates a pair of spaced ball bearings 34 for supporting the arbor 29 for spinning about the axis of symmetry 35 of the disk and housing. The end wall portion 36 of wall portion 13 is provided with a flange 37 to which a flange 33' of the stub shaft 33 is removably attached, as by screws 38. Bearings 34 are preloaded by means of preload adjusting nut 40. Bellville washers 39 provide for positive clamping of the outer bearing inner race ring to prevent radial motion of the inner ring.

In manufacture, the disk 27 and armature 31 are assembled on arbor 29 and the assembly is carefully statically and dynamically balanced after the arbor has been assembled into the cartridge 33 and the bearings carefully pre-loaded through nut 40. The resulting disk-/arbor subassembly is then inserted into the stator 32 and screws 38 tightened down. Note that the diameter of the attaching flange 33′ of stub shaft 33 is less than the internal diameter of the stator 32 so that the disk/arbor assembly 25 may be always inserted and removed as an assembly thereby eliminating any requirement for rebalancing the rotating elements and any requirement to reestablish spin bearing pre-load.

Figure 4:
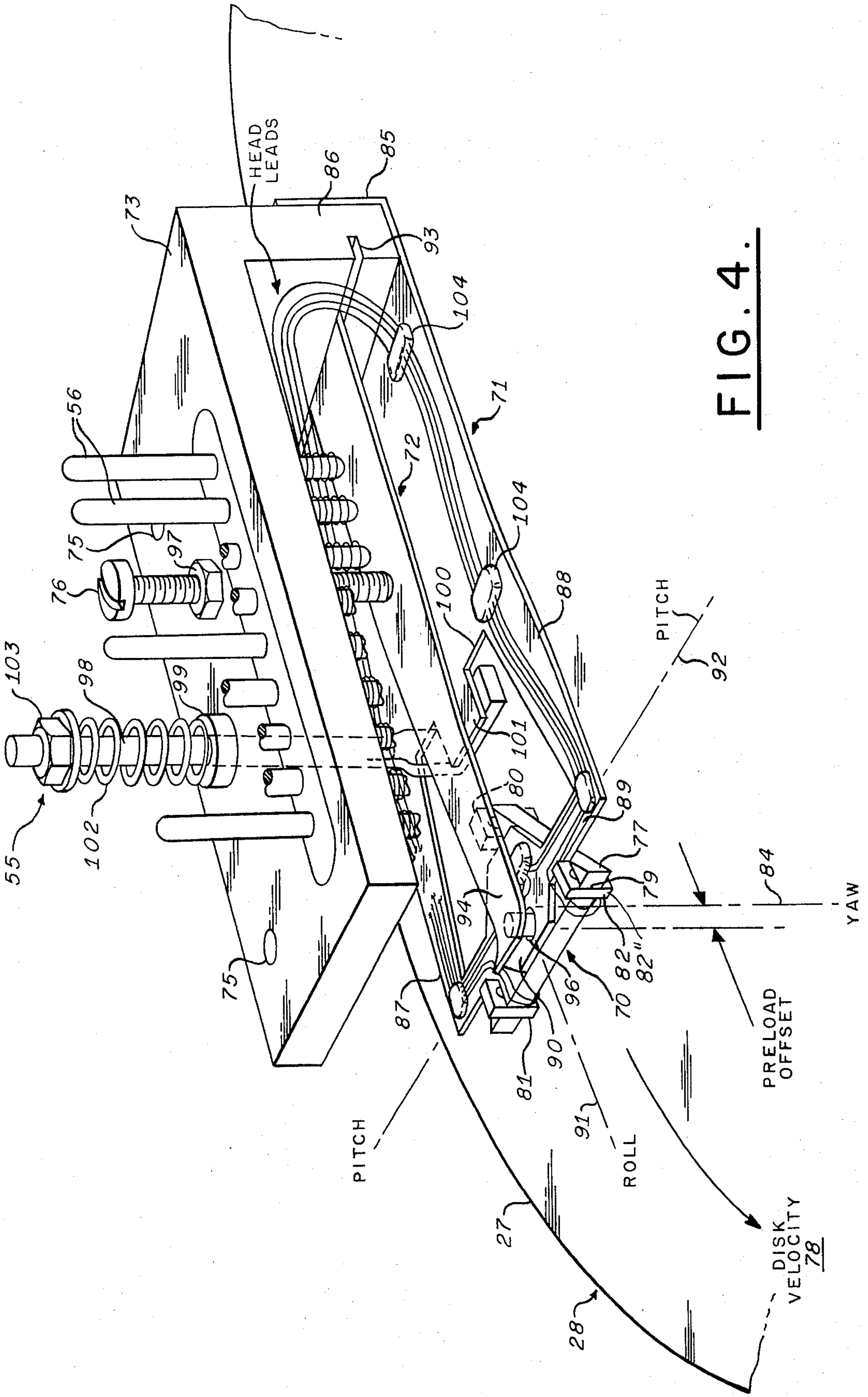
FIG. 4 is a perspective view of a typical trimaran head support and flexure assembly.
Figure 5:
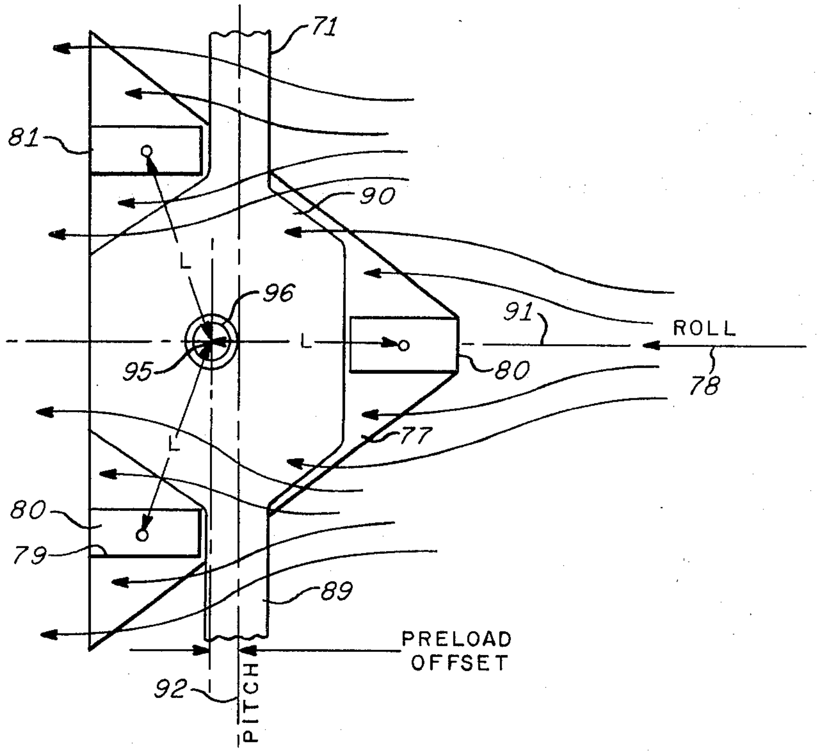
FIG. 5 is a plan view of the trimaran head.
Figure 6:
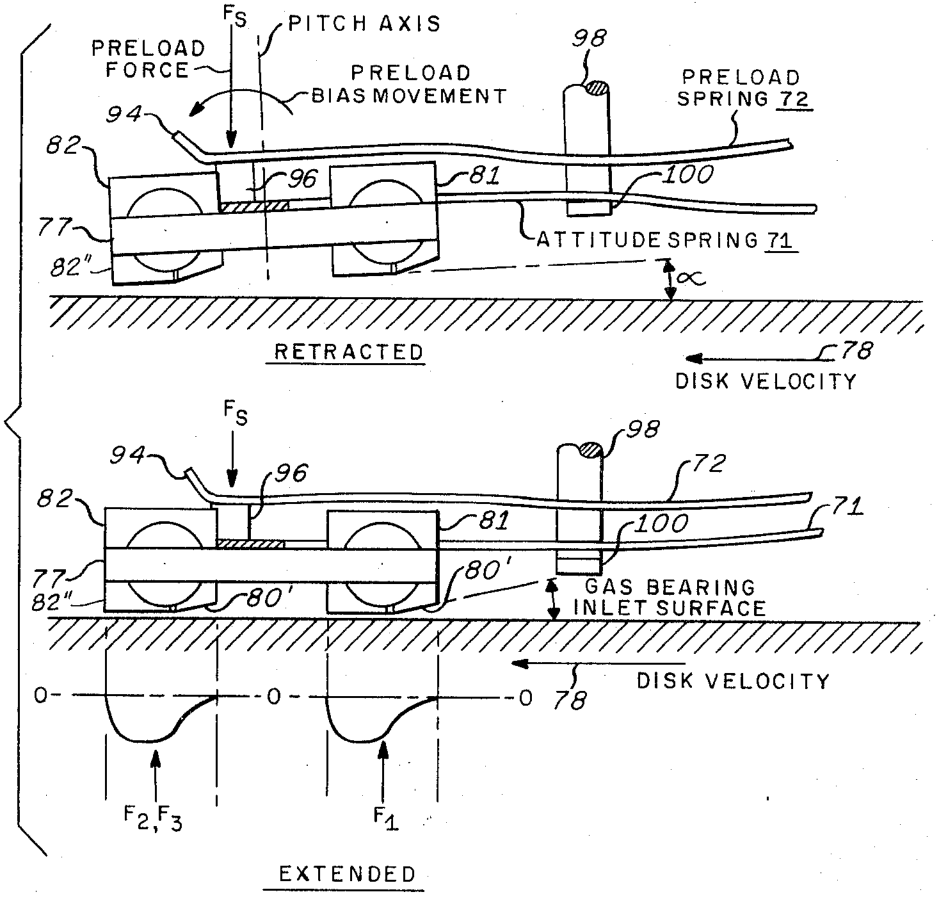
FIG. 6 comprises two views of one trimaran head and flexure shown in its retracted and normal operating position.

The main read/write head and extension and retraction mechanism subassembly 26 comprises cylindrical outer housing wall 14 and an integral interior bridge plate 45. The axial dimensions of outer wall portion 12 and intermediate wall portion 14 establishes an internal space between the magnetizable face 28 of disk 27 and the bridge plate 45 for accommodating a plurality of individual read/write head assemblies 46 through 53 the detailed structure of which is shown in FIGS. 4–6 and which will be described below. As shown in FIG. 2, the bridge plate 45 has a plurality of cut outs 54 adjacent the head assemblies through which the extension and retraction elements protrude as shown typically at 55 for head assembly 47 in FIG. 2, and for head assembly 53 in FIG. 1. Also through these apertures extend the electrical terminals for each head as shown typically at 56 for head assembly 47 in FIG. 2. Further electrical terminals, shown typically at 57 for the head assembly 47 and for head assembly 51 in FIG. 2, are provided for mounting a plurality of diode semiconductors 58 of the read/write electronics.

The head extension and retraction mechanism of the magnetic disk memory comprises a circular plate 60 of magnetic material axially slidable on a plurality of pins 61 fixed to and uniformly angularly spaced, e.g., 120° apart, about the periphery of bridge plate 45 and an electromagnet or solenoid 62 centrally mounted on plate 45. Solenoid 62 is arranged so that when excited the plate 60 is moved toward the solenoid, the motion being limited by suitable stop pins 63, depressing the elements 55 thereby to simultaneously lower the read/write heads of each head assembly into operative position as will be described below in connection with FIGS. 4, 5 and 6. The cylindrical housing wall portions 12, 14 and 15 are all suitably keyed and rigidly interconnected by means of elongated screws 65. In one embodiment of the present invention the housing larger cylindrical wall diameter was about five inches and the housing's over-all length about four inches, the disk diameter being about four inches.

Referring now to FIGS. 4, 5 and 6, the details of one of the plurality of identical read/write head assemblies 46–53 is shown. FIG. 4 is a pictorial three dimensional view of a typical head assembly which comprises generally a read/write ferrite core support structure 70, referred to as a trimaran head, supported by a support flexure 71 and preloaded toward the surface 28 of disk 27 by preload flexure 72. The flexures 71 and 72 are rigidly supported relative to the housing (bridge plate 45) through mounting bracket 73 as by means of suitable mounting screws 74 (FIG. 2) and tapped holes 75 in the bracket 73. The bracket 73 further provides a slidable support for the head extension/retraction plunger 55, a preload adjusting screw 76 and the plurality of electrical terminals 56, the latter elements extending through the cutouts 54 in bridge plate 45 (see FIG. 2).

The trimaran head comprises a base plate 77 in the form of an equilateral triangle of a suitable material, such as an anodized aluminum alloy. The plate is oriented relative to the disk velocity vector 78 with one of its acute angles leading and the other two trailing. Three slots, such as 79, are formed in the plate 77, having their long dimension parallel to disk velocity, and into which are secured, as by epoxy cement, three ferrite core and winding elements 80, 81 and 82, core element 80 constituting the lead element and 81 and 82 the trailing elements. It will be noted that the core elements 80, 81 and 82 are so mounted on the plate 70 that the lower extremities thereof, such as extremity 82″, extend equally below the under surface of the plate, see particularly FIG. 6, and each bottom leading edge of each core is ground or lapped as at 80′ to form a small angle relative to the plane defined by the remainder of the lower core surfaces. This small angle provides a gas inlet surface so that with the disk rotating (FIG. 6) at high speed and the heads extended, a gas bearing a few millionths of an inch thick is formed between the core elements themselves and the disk surface and the heads and plate are floated or "fly" on this three point gas bearing, hence the coined term "trimaran head." In one embodiment of the present invention the plate 77 was about two hundred fifty thousandths of an inch long, the ferrite cores seventy thousandths inch thick and extended below the lower surface of plate 77 a distance of about thirty thousandths inch. The flying height with this embodiment was 20 to 30 microinches at 1,000 in/sec velocity. With this trimaran configuration, the extremely small "footprint" or gas bearing surface which is 0.025 wide ×0.060 long contributes greatly to the reliability of the present disk memory apparatus in that any small airborne particles such as dust particles tend to be pushed away from the gas bearing surfaces, see for example the air flow arrows depicted in FIG. 5, and therefore will not be trapped between the gas bearing surfaces and score or otherwise damage the recording surface and/or head.

As stated above, the trimaran head 70 is suspended relative to the disk 27 by a flexure 71. This flexure comprises a fairly wide flat spring having one end 85 bonded, as by epoxy cement, to a downwardly extending projection 86 of bracket 73. The remote end of spring 71 is provided with a generally rectangular opening which defines a pair of relatively narrow lenghtwise extending fingers 87, 88 the outer ends of which are joined by a relatively narrow, laterally extending cross member 89. Member 89 is widened at its central portion to provide a pad 90 to which the trimaran head is bonded again as by epoxy adhesive. The latter structure is more clearly illustrated in FIG. 5. The support bracket 73 and head flexure support 71 are oriented relative to bridge plate 45 such that the fingers 87, 88 extend in a trailing direction and generally parallel to the disk velocity vector 78 and the cross member 89 extends normal therto. With this orientation together with the narrow flexible, i.e., twistable fingers 87, 88 and 89, it is clear that the trimaran head is supported relative to the disk 27 with limited freedom of rotation about a longitudinal or roll axis 91 and a lateral or pitch axis 92 but with rigidity about the vertical or yaw axis 84. With this construction, the individual feet or "hulls" of trimaran head 70 are free to adapt themselves to any unevenness of or undulations in the surface 28 of the disk 27 and to equalize the preloads on the three heads.

In order to provde a reactive load for the head supporting gas pressure, the further flexure 72 is provided.

This further flexure or preload spring is rigidly secured at one end, for example, in slot 93 of the bracket extension 86 as by epoxy adhesive while its free end 94 is adapted to apply a downward or reactive load on the trimaran head 70. The point on head assembly 70 at which this load is applied is carefully and precisely determined as the centroid or center of mass 95 of the trimaran head 70 which also corresponds to the center of buoyancy of the head during disk operation. This point is positively defined by a stud 96 extending upwardly from the surface of the plate 77 through a suitable cut out in support flexure pad 90, and the load spring end 94 rests on the top of the stud as shown clearly in FIG. 6. The amount of preload is adjustable by means of preload adjusting screw 76 threaded in bracket 73 and clamped in place by lock nut 97, the lower end of screw 76 contacting the upper surface of flexure 72. As shown in FIG. 6, the amount of preload $F_s$ together with the inlet ramps 80' and undersurface of each core combine to generate the gas pressure profiles as shown and wherein $F_1 + F_2 + F_3 = F_s$.

In accordance with the teachings of the present invention, the pitch support arm 89 is secured to the trimaran upper surface such that the pitch axis 92 lies just forward (relative to disk velocity) of the centroid of the trimaran head assembly 70, that is, the stud 96 is positioned just aft of the pitch axis 92 as shown in FIG. 5. This offset between the axis of suspension and the point of force produces a couple about the pitch axis tending to tilt the leading edge of head 70 upward in the retracted condition, thereby establishing an initial angle of attack $\alpha$ the head 70 relative to the disk surface, see FIG. 6. Therefore, when the head is released or extended and it approches a "landing" on the disk, the trailing heads 81, 82 initially contact the disk surface and on continued lowering of the head 70, under the influence of load spring 72, it will rotate forwardly and gradually generate the gas bearing pressure profiles $F_{1,2,3}$. If it were attempted to lower the head 70 with the bottom core surfaces parallel to the disk surface, any non-uniformity or unevenness in the disk surface could cause initial contact with the disk at any one of the cores which, particularly if the leading core contacted first, could produce a destabilizing frictional force on the head assembly 70 which could result in an overturning force or a divergent pitch oscillation and undesirable and damaging chatter between core and disk. Thus, the initial angle of attack provided by the present arrangement eliminates any divergent friction induced pitching moments during the initial alignment of the head assembly 70 with the disk surface.

The retraction and extension mechanism was described above with respect to how the head lifter or plunger 55 was raised and lowered through plunger plate 60 and solenoid 62. The plunger leg 55 is shown in more detail in FIG. 4 and comprises a smooth rod 98 extending through a bore or bushing 99 in bracket 73 and terminating in a foot portion 100 laterally extending underneath a longitudinal extension 101 of head support flexure 71, extending into the rectangular opening therein. The upper end of plunger 55 is threaded and compression spring 102 is retained between busing 99 and a nut and washer 103 screwed thereon. The spring 102 therefore normally urges the foot 100 upward carrying with it support flexure 71 and trimaran head 70 to the retracted position. If desired, the vertical movement of plunger 55 may be limited by means of a pin and slot arrangement (not shown) within the bushing 99 which together with stop pins 63 assures protection of the disk surface 28 and also prevents damage to the flexures 71, 72 during assembly and maintenance.

It should be noted that the head assembly mounting bracket 73 is secured to the bridge member 45 in such an orientation relative to the direction of rotation of disk 27 that the support flexure 71 extends in the direction of disk velocity and hence the trimaran head 70 "trails" the disk velocity. This arrangement has the advantage of greatly increasing the stability of the floating head in caparison with a "leading" head suspension arrangement or one in which the flexures extend radially of the disk. It will be apparent that with the latter arrangements any drag forces produced on "landing" or during operation will tend to buckle the flexure 71 or impart a twisting moment thereon, respectively. Such buckling or twisting forces can tend to set up a "pitch" oscillation or disablizing moment which tend to overturn the head and could result in catastrophic failure of the disk memory.

The plurality of electrical signal leads for the core elements 80, 81 and 82 are collected and laid along the upper surfaces of cross arm 89 and fingers 87, 88 and flexure 71 and secured in place by drops of epoxy adhesive, as typically shown at 104. The lead bundles are routed upwardly along bracket extension 86 and thence back along the under surface of bracket 73 where they are individually attached to the plurality of pin terminal 56 described above.

Figure 3:
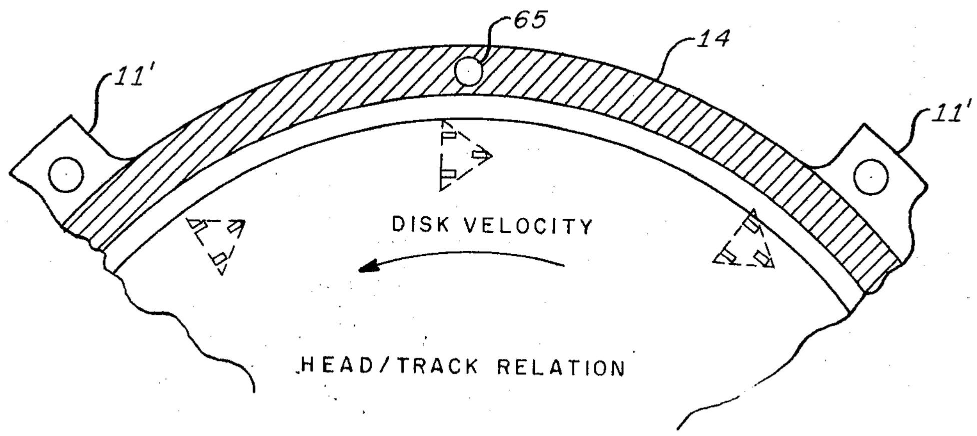
FIG. 3 is a lateral partial cross sectional view of the memory showing the spacial distribution of the trimaran heads relative to the recording disk.

Referring now to FIGS. 2 and 3, each of the read/write head and flexure assemblies is distributed uniformly along a spiral path about the disk spin axis such that the individual cores of the heads 70 radially overlap to define a large plurality of separate recording tracks on the disk. In the embodiment illustrated the core spacing and head distribution is such that, for example, there is sufficient radial space between the cores 80 and 81 (FIG. 5) for the tracks of two other cores as clearly illustrated in FIG. 3. By this arrangement and in the disclosed embodiment, it is possible to define twenty four recording tracks with eight spirally distributed read/write head assemblies and with this density, approximately one million bits of information may be stored.

While the invention has been described in its preferred embodiments, it is to be understood that the words which have been used are words of description rather than limitation and that changes may be made within the purview of the appended claims without departing from the true scope and spitit of the invention in its broader aspects.

We claim:

1. A magnetic disk memory apparatus comprising a closed housing containing a gas atmosphere, a disk member having a magnetizable surface and motive means supported within said housing for spinning said disk at high speed about its axis of symmetry, at least one read/write head assembly including at least one core and coil element carried by an integral support member, a portion of said core element only extending from a surface of said support member normally adjacent said disk surface, said head assembly further comprising flexure means coupled between said housing and said core support member including means for forcing said support member toward said disk surface, and said extending core portion including a gas pressure generating configuration on its leading edge relative to disk velocity for generating a gas pressure opposing said flexure force to thereby provide a gas bearing support for said core and support member.

2. The apparatus as set forth in claim 1 wherein said read/write head assembly includes a plurality of core and coil elements carried by said integral support member each being so spaced thereon as to define radially spaced tracks on said disk surface, a portion only of each of said cores extending from said support surface adjacent said disk surface and each extending portion including said gas pressure generating configuration.

3. The apparatus as set forth in claim 2 wherein said integral support means comprises a flat, triangular shaped member with one of said core and coil elements postioned at the apexes of said triangular member.

4. The apparatus as set forth in claim 3 wherein said flexure means includes a first spring means for controlling the lateral orientation of said support member relative to the velocity vector of said disk and a second spring means for suppluing said load force.

5. The apparatus as set forth in claim 4 wherein said head assembly includes adjustable means cooperable with said second spring means for varying the load force applied to said core support member thereby.

6. The apparatus as set forth in claim 4 further including means for displacing said core support member toward and away from said disk surface and wherein said first spring means includes means for suspending said core support member with limited rotational freedom about its pitch axis relative to the disk velocity vector, and means on said support member displaced from said pitch axis in a direction along said velocity vector for receiving the load force of said second spring means whereby said core support member is tilted about said pitch axis relative to said disk surface upon displacement thereof toward and away from said disk surface.

7. The apparatus as set forth in claim 6 wherein said load force receiving means is displaced aft of said pitch axis support relative to said disk velocity whereby said support member is tilted up upon retraction and initial approach.

8. The apparatus as set forth in claim 1 further including a plurality of read/write head assemblies distributed about said disk spin axis and relatively radially displaced therefrom whereby to define a plurality of radially spaced recording tracks on said disk surface.

9. The apparatus as set forth in claim 8 wherein each of said read/write head assemblies includes means coupled with said flexure means for displacing said core support member toward and away from said disk surface, said apparatus further including a disk-shaped armature member supported in said housing coaxially with said disk spin axis and actuatable along said axis, said armature member being cooperable with each of said support member displacing means and electromagnetic means supported coaxially with said spin axis for actuating said armature member and thereby simultaneously displacing all of said core support members relative to said disk surface.

10. The apparatus as set forth in claim 6 wherein said load froce receiving means is located on said support member coincident with the center of buoyancy of said support member.

* * * * *